United States Patent Office 3,294,684
Patented Dec. 27, 1966

3,294,684
LUBRICANT COMPOSITIONS CONTAINING
DETERGENCY ADDITIVES
Herbert A. McNinch, Portage, and Robert E. Karll, Munster, Ind., assignors to Standard Oil Company, Chicago, Ill., a corporation of Indiana
No Drawing. Filed July 11, 1963, Ser. No. 294,234
6 Claims. (Cl. 252—46.7)

This invention relates to new compositions of matter containing polyvalent phosphorus, sulfur, nitrogen and carboxylic acid groups and more particularly, pertains to oil-soluble compositions derived from alkenyl adducts of unsaturated dicarboxylic acids and alkyl sulfur-containing acids of phosphorus reacted with linear polyamines, as well as the use of such compositions in lubricants.

Many phosphorus, sulfur and nitrogen containing compositions which are the products of chemical reactions and the products of physical admixture have been proposed. Certain of these compositions have found use as lubricant additives as detergents, anti-oxidants, etc. More recently, succinimides derived from hydrocarbon-substituted succinic acid and various amines have been proposed for use as lubricant additives.

We have discovered a new class of compositions containing polyvalent phosphorus, sulfur, nitrogen and carboxylic acid groups wherein there are amide groups and $-NH_2 \cdot HS-P<$ salt groups. These compositions are derived from the reaction of a polyamine, preferably a linear polyamine, with a phosphosulfurized hydrocarbon to form a partial salt of the phosphosulfurized hydrocarbon and the polyamine. This partial salt is then reacted with an alkenyl-substituted aliphatic dicarboxylic acid anhydride.

The polyvalent phosphorus-containing reactant is suitably obtained by reacting a phosphorus sulfide with an unsaturated olefinic hydrocarbon, preferably one of the hereinafter mentioned viscous liquid polypropylenes or polybutylenes at elevated temperature of from 200 to 600° F. with ratios of 5 to 50%, preferably 10 to 25% of a phosphorus sulfide, e.g. $P_2S_5$, based on the hydrocarbon.

Insofar as this invention is concerned the mono-olefinic polymer employed to prepare the alkenyl-substituted aliphatic dicarboxylic acid or anhydride (e.g. alkenyl succinic anhydride) and the mono-olefinic polymer reacted with a phosphorus sulfide, such as $P_2S_5$ to prepare the phosphosulfurized hydrocarbon, can be the same or they can be different members of this class. These hydrocarbons are mono-olefin hydrocarbon polymers resulting from the polymerization of low molecular weight mono-olefin hydrocarbons, such as propylene, butenes, amylenes or copolymers thereof. Such polymers may be obtained by the polymerization of mono-olefins of less than 6 carbon atoms in the presence of a catalyst, such as sulfuric acid, phosphoric acid, boron fluoride, aluminum chloride, or other similar halide catalysts of the Friedel-Crafts type.

The polymers employed are preferably mono-olefin polymers or mixtures of mono-olefin polymers and isomono-olefin polymers having molecular weights ranging from about 150 to 50,000 or more and preferably from about 500 to about 10,000. Such polymers can be obtained, for example, by the polymerization in the liquid phase of a hydrocarbon mixture containing mono- and isomono-olefins, such as butylene and isobutylene, at a temperature of from about −80° F. to about 100° F. in the presence of a metal halide catalyst of the Friedel-Crafts type, such as for example, boron fluoride, aluminum chloride, and the like. In the preparation of these polymers, a hydrocarbon mixture containing isobutylene, butylenes and butanes recovered from petroleum gases, especially those gases produced in the cracking of petroleum oils in the manufacture of gasoline, can be used.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with iso-octane. The hydrocarbon mixture is introduced into the bottom of the reactor and passed upward through the catalyst layer, while a temperature of from about 50° F. to about 110° F. is maintained in the reactor. The propane and other saturated gases pass through the catalyst, while the propylene is polymerized under these conditions. The propylene polymer can be fractionated to any desired molecular weight, preferably from about 500 to about 1000 or higher.

Other suitable polymers are those obtained by polymerizing a hydrocarbon mixture containing about 10% to about 25% isobutylene at a temperature of from about 0° F. to about 100° F., and preferably 0° F. to about 32° F., in the presence of boron fluoride. After the polymerization of isobutylene, together with a relatively minor amount of the normal olefins present, the reaction mass is neutralized, washed free of acidic substances, and the unreacted hydrocarbon subsequently separated from the polymers by distillation. The polymer mixture so obtained, depending upon the temperature of reaction, varies in consistency from a light liquid to viscous oily material and contains polymers having molecular weights ranging from about 100 to about 2,000 or higher. The bottoms resulting from the fractionation of the polymer which have Saybolt Universal viscosities at 210° F. ranging from about 50 sec. to about 10,000 sec. are well suited for this purpose.

Essentially paraffinic hydrocarbons, such as bright stock residuums, lubricating oil distillates, petrolatums, or paraffin waxes may be used. There can also be employed the condensation products of any of the foregoing hydrocarbons, usually through first halogenating the hydrocarbons and reacting with aromatic hydrocarbons in the presence of anhydrous inorganic halides, such as aluminum chloride, zinc chloride, boron fluoride, and the like.

Examples of other high molecular weight olefinic hydrocarbons which can be employed are cetene ($C_{16}$), cerotene ($C_{26}$), melene ($C_{30}$) and mixed high molecular weight alkenes obtained by cracking petroleum oils.

Other preferred olefins suitable for the preparation of reaction products are olefins having at least 20 carbon atoms in the molecule of which from about 13 carbon atoms to about 18 carbon atoms and preferably at least 15 carbon atoms are in a long chain. Such olefins can be obtained by the dehydrogenation of alkyl halides, preferably long chain alkyl halides, particularly halogenated paraffin waxes.

As a starting material there can be used the polymer or synthetic lubricating oil obtained by polymerizing unsaturated hydrocarbons resulting from the vapor phase cracking of paraffin waxes in the presence of aluminum chloride which is fully described in U.S. Patents 1,995,260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed.

The phosphosulfurized hydrocarbons derived from the foregoing hydrocarbons are prepared by reacting the hydrocarbon with from 5% to 50%, preferably 10% to about 25%, of a phosphorus sulfide, preferably $P_2S_5$, at a temperature of from 200 to 600° F., particularly at a temperature of from 325 to 500° F., while maintaining a non-oxidizing atmosphere, such as, for example, an atmosphere of nitrogen above the reaction mixture. It is desirable to use as much phosphorus sulfide as can react with the hydrocarbon for its full utilization. Practical mole ratios of phosphorus sulfied to hydrocarbon are about 1:1. The use of greater amounts of phosphorus sulfide results in unused phosphorus sulfide without obtaining additional advantage.

Preferably, the alkenyl-substituted aliphatic dicarboxylic acid anhydride is one derived from a polymer of a mono-olefin having a 3 to 4 carbon atoms, such as polypropylene or polybutylenes or copolymers of mono-olefins and iso-olefins adducted with maleic anhydride to form an alkenyl succinic anhydried. For ultimate use as a lubricant additive the polymeric mono-olefin should be a viscous liquid polyolefin having a viscosity as measured in Universal Saybolt seconds (SUS) at 210° F. of from 50 to 10,000. Such viscous liquid polypropylenes and polybutylenes (polyisobutylenes) are well known to those skilled in the art and can be conveniently prepared, for example, by polymerizing propylene isobutylene, hydrocarbon fractions containing butane and butenes including isobutylene in the presence of aluminum chloride among other catalysts. These viscous liquid polypropylenes and polybutylenes contain a limited amount of residual unsaturation of which there is at least one terminal carbon-to-carbon unsaturated group in the polymer molecule. Because of this terminal unsaturation, these viscous liquid polypropylenes and polybutylenes can be reacted with maleic anhydride as well as other anhydrides of similar unsaturated aliphatic dicarboxylic acids or their anhydrides to form alkenyl derivatives, for example, alkenyl succinic anhydride.

By "linear polyamine" is meant amines of the class known as "ethylene amines" which class is derived from the reaction of ethylene dichloride and ammonia and can be exemplified by the formula

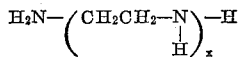

where $x$ is an integer from 1 to 8. Examples of such linear polyamines suitable for this invention are ethylene diamine, diethylene triamine, triethylene tetramine, tetra-ethylene pentamine, pentethylene hexamine, hexa-ethylene heptamine, hepta-ethylene octamine and octa-ethylene nonamine. Of these, the desired members of the class of ethylene amines are those in which $x$ above is from 3 to 6 and tetraethylene pentamine is preferred. The preferred tetraethylene pentamine is available in commercial quantities as a mixture consisting mainly of tetraethylene pentamine with small amounts of triethylene tetramine and lower analogs. Such other polyamines as propylene diamine, diamino cyclohexane, phenylene diamine and the like are also suitable. All of these polyamines contain two primary nitrogen groups.

Specific preparations of typical phosphosulfurized hydrocarbons useful to prepare the additive compositions of this invention are illustrated by the following preparations.

PREPARATION I

A polybutene of about 750 molecular weight is reacted with 15.5% $P_2S_5$ at 450° F. for 5.5 hours under a nitrogen blanket to provide 12,000 grams of the polybutene phosphosulfurized reaction product. Each 710 grams of this phosphosulfurized reaction product contains one mole of phosphorus.

PREPARATION II

A polypropylene of about 800 molecular weight is reacted with 15.5% $P_2S_5$ at 400° F. for about 7 hours under a nitrogen blanket to provide about 15,000 grams of the polypropylene phosphosulfurized reaction product. Each 710 grams of this phosphosulfurized reaction product contains one mole of phosphorus.

The alkenyl derivative of an unsaturated aliphatic dicarboxylic acid or anhydride can be prepared as illustrated in the following preparations.

PREPARATION III 895 grams of a polybutene having an average ebullioscopic molecular weight of about 2000 and a viscosity at 210° F. of about 15,000 and 595 grams of a polybutene having an average ebullioscopic molecular weight of about 860 and a viscosity at 210° F. of about 1000 were placed in a 5-liter flask. Both polybutenes were products from the polymerization of mixed n-butene and isobutene. 178 grams (1.82 moles) of maleic anhydride and 300 grams of the 860 molecular weight polybutene were placed in a 3-liter beaker. The 5-liter flask containing the polymer mixture was heated at low temperature overnight under a nitrogen blanket to a temperature of about 257° F. The polymer mixture was then stirred and heat was increased while continuing to blow the surface with nitrogen to a temperature of 417° F. The contents of the 3-liter breaker were added as a melt slurry to the 5-liter flask while continuing to heat (35 minutes). Heat was continued for about 12 hours to a temperature of about 465° F. and the reactants were then allowed to cool overnight. After about 10 hours of cooling, the contents of the 5-liter flask were reheated under nitrogen and 600 grams of SAE 5 mineral lubricating oils were added as a diluent. Heating was continued while blowing with nitrogen to remove unreacted maleic anyhdride to a temperature of about 460–470° F. The product was filtered through Celite at about 392° F. and a light clear filtrate was obtained. An acid number of 33 (corrected) indicates that a yield of 40.5 percent was obtained.

PREPARATION IV 1420 grams of the 860 molecular weight polybutene and 300 grams of solvent-extracted SAE 5 mineral lubricating oil were added to a 5-liter flask. The oil and polymer mixture was heated and blown with nitrogen with vigorous stirring to a temperature of 436° F. A slurry of 196 grams (2 moles) of molten maleic anhydride and an additional 300 grams of the polymer were added to the heated mixture and heating was continued until the mixture was at a temperature of about 330 to 450° F. Heat was then removed and the mixture was cooled overnight. The mixture was then reheated and stripped of unreacted maleic anhydride by nitrogen blowing up to 450° F. The product was then filtered through Celite and a filtrate was recovered having an acid number of 41.0 (corrected yield of 39%).

The compositions of this invention are prepared by reacting a sufficient amount of the phosphosulfurized hydrocarbon to provide 0.5 to 1.5, preferably 1.0, mole of phosphorus per mole of ethylene amines to form the partial salt. This reaction is conveniently carried out at 200 to 400° F., preferably the hot phosphosulfurized hydrocarbon is cooled to about 230 to 250° F., the polyamine is added slowly thereto so that a temperature increase of not more than 30 to 50° F. occurs. Thereafter, the mixture is heated with stirring to about 300 to 400° F., preferably 330 to 340° F. while blowing with inert gas, e.g. nitrogen to remove gaseous by-products. The resulting mixture is cooled to a temperature in the range of 225 to 275° F. and 0.5 to 1.5 moles, preferably 1.0 mole of the polyalkenyl dicarboxylic acid anhydride, e.g. polybutenylsuccinic anhydride is added. This mixture is maintained 250 to 300° F., preferably 270 to 290° F. and stirred until the reaction is substantially completed, about 0.75 to 1.5 hours. This product can be stripped with inert gas and filtered through a filter aid, e.g. diatomaceous earth, fuller's earth and the like. This filtered product can be used as a lubricant additive as an ashless dispersant-detergent for crankcase lubricants.

Another aspect of this invention is conducted by reacting boric acid with the phosphosulfurized-ethylene amines-polyalkenyl dicarboxylic acid anhydride product before the final stripping with inert gas. The amount of boric acid used is in the range of 2 to 7 moles, preferably 3 moles, per mole of amine. This boration reaction is carried out at 300 to 400° F., preferably 330 to 340° F. for 2 to 5 hours, preferably about 3 hours. Following boration, the reaction mixture is stripped with inert gas, e.g. nitrogen and then filtered in the presence of a filter aid, e.g. diatomaceous earth, fuller's earth and the like.

The boration product is a rather useful form of the detergent-dispersant additive of this invention since it has improved response to anti-rust and anti-corrosion additives.

The compositions of this invention and their preparation will be more clearly understood from the following illustrative examples.

*Example 1*

To a reaction vessel there is added 677 weight parts of phosphosulfurized polybutene containing 2.1% phosphorus (0.452 mole P) obtained from a polybutene having a viscosity at 210° F. of 1000 Saybolt seconds, and heated to 240° F. There is then added 86 weight parts (0.452 mole) tetraethylene pentamine over a period of 90 minutes. The reaction temperature rises to about 280° F. during the polyamine addition. The resulting mixture is stirred and heated to 330–340° F. for about 3 hours and blown with nitrogen for an additional 60 minutes. This reaction mixture is cooled to 250° F. and there is added 687 weight parts of a solution at 280° F. of polybutenylsuccinic anhydride containing 0.452 mole of the polybutenyl succinic anhydride in SAE 5 oil. The polybutenyl group is also derived from the aforementioned polybutene of a viscosity of 1000 Saybolt seconds at 210° F. The resulting mixture is stirred and held at 280° F. for 60 minutes and blown with nitrogen for 60 minutes and then filtered through Celite diatomaceous earth.

*Example 2*

The process of Example 1 is repeated up to and including the addition of the polybutenyl succinic anhydride and the reaction time of 60 mintues. Thereafter, 126 weight parts of boric acid (2.03 moles) providing one atom boron per atom of nitrogen. This mixture is heated to 330–340° F. for 3 hours, stripped with nitrogen for 60 minutes and filtered through Celite diatomaceous earth. The boron to nitrogen mole ratio is 1 to 1.

*Example 3*

The process of Example 1 is again repeated up to and including the reaction with polybutenyl succinic anhydride. Thereafter, 76 weight parts of boric acid (1.2 moles to provide 0.6 mole boron per mole of nitrogen). This mixture is heated to 330–340° F. for 3 hours, stripped with nitrogen for 60 minutes and filtered through Celite diatomaceous earth.

The foregoing products of Examples 1, 2 and 3 are dissolved in a base lubricant in a concentration of 2% based on the total formulation according to the following:

|  | Example 4 | Example 5 | Example 6 |
|---|---|---|---|
| Solvent extracted SAE 10 oil, percent | 96.66 | 96.66 | 96.66 |
| Product from Example, percent | [1] 2.0 | [2] 2.0 | [3] 2.0 |
| Zinc dialkyldithiophosphate oxidation inhibitor, percent | 1.2 | 1.2 | 1.2 |
| Polymeric fatty acid anti-rust, percent | 0.17 | 0.17 | 0.17 |

[1] Example 1. [2] Example 2. [3] Example 3.

These oils were tested in the Lincoln M.S. V Test Sequence designed by Ford Motor Company. The Lincoln sequence tests procedure evaluates low temperature dispersancy characteristics of a lubricating oil. Briefly, the test consists of using the oil to be tested as a lubricating oil in a V-8 Lincoln engine under prescribed test conditions. Accordingly, 5 quarts of oil are placed in the crankcase and the engine is started and run in accordance with the 4-hour cycle:

|  | Phase 1 | Phase 2 | Phase 3 |
|---|---|---|---|
| Duration | 45 min | 2 hr | 75 min. |
| Speed, r.p.m | 500 | 2,500 | 2,500. |
| Load, lbs | No Load | (105 HP) | (105 HP). |
| Temperature, °F.: |  |  |  |
| Water out | 115–120 | 125–130 | 170–175. |
| Oil Sump | 120–125 | 175–180 | 205–210. |
| A/F | 9.5±0.5 | 15.5±0.5 | 15.5±0.5. |

The 4-hour cycle is reset a total of 48 times (192 hours running time). After each 16 hours of operation the engine is shut down for 8 hours. Two-ounce samples of oil are taken every 30 hours and the oil level is adjusted with fresh oil to a level of 5 quarts. Added oil is weighed. At the termination of the test, the hot oil is drained, measured and recorded. The engine is then disassembled and examined for deposits of varnish and sludge among other observable results as set out in Table I below.

TABLE I

[Lincoln M.S. V results]

| Oil Formulation | Sludge Rating | Varnish Rating | Oil Ring Filling, percent | Oil Screen Plugging, percent |
|---|---|---|---|---|
| Example 4 | 45 | 33 | 0 | 2 |
| Example 5 | 32 | 30 | 30 | 5 |
| Example 6 | 38.3 | 37.2 | 12 | 1.0 |

The dispersants prepared as disclosed herein can be used as addition agents in lubricating oils and especially in lubricating oils for use in internal combustion engines. The addition agents impart excellent low temperature dispersancy characteristics to the lubricating oil. Although amounts of the dispersancy addition agent may be varied as desired, it is believed advantageous to use at least about 0.01 weight percent and up to 20 weight percent of the addition agent of this invention and preferably 0.2 to 5 weight percent in a suitable lubricating oil. Although the preferred lubricating oils are the mineral lubricating oils, the use of the additive compositions is not restricted thereto. Other lubricating oil bases can be used, such as hydrocarbon oils, both natural and synthetic, for example, those obtained by the polymerization of olefins, as well as synthetic lubricating oils of the alkylene oxide type and the mono- and polycarboxylic acid ester type, such as the esters of adipic acid, sebacic acid, azelaic acid; it is also contemplated that various other well-known additives, such as anti-oxidants, anti-foam agents, pour point depressors, extreme pressure agents, corrosion inhibitors, anti-wear agents, etc. may be incorporated in lubricating oils containing the additives of our invention.

Concentrates of a suitable oil base containing more than 10 percent, for example, up to 75 percent or more, of the additive of this invention alone or in combination with other additives may be prepared and can be used for blending with hydrocarbon oils or other oils in the proportions desired for the particular conditions of use to give a finished lubricating product containing the additives of this invention. In order to exemplify the use of the reaction products prepared in accordance herewith as low dispersancy lubricating oil addition agents, examples of formulated lubricating oils containing such reaction products were prepared.

What is claimed is:

1. A lubricant additive composition which comprises the product of first reacting in equimolecular proportions a phosphosulfurized polybutene and an ethylene amine polyamine at 200 to 400° F. followed by reaction with an equimolecular proportion of polybutenyl succinic anhydride at a temperature of from 250 to 300° F. and then reacted with boric acid in an amount in the range of from 2 to 7 moles per mole of said polyamine at a temperature in the range of from 300 to 400° F.

2. The composition of claim 1 wherein the reactions are carried out in the presence of a light hydrocarbon oil diluent and the first and last reaction are followed by stripping with an inert gas.

3. The composition of claim 1 wherein the polyamine is tetraethylene pentamine and the boric acid is used in the range of 0.6 to 2.0 moles boron per mole of nitrogen.

4. A lubricant composition comprising a major portion of a normally liquid lubricating oil and from 0.01 to 20% of the composition of claim 1.

5. A lubricant composition comprising a major portion of a normally liquid lubricating oil and from 0.01 to 20% of the composition of claim 3.

6. An addition agent concentrate comprising as an essential additive 10 to 75% of the composition of claim 3 in a diluent comprising 25 to 90% of a normally liquid lubricating oil.

References Cited by the Examiner

UNITED STATES PATENTS

| 2,849,398 | 8/1958 | Moody et al. | 252—32.7 |
| 3,087,936 | 4/1963 | Le Suer | 252—49.6 |
| 3,089,851 | 5/1963 | Klass et al. | 252—32.7 |
| 3,172,892 | 3/1965 | Le Suer et al. | 252—51.5 |
| 3,184,412 | 5/1965 | Lowe et al. | 252—46.7 |
| 3,185,643 | 5/1965 | Lowe et al. | 252—46.7 |
| 3,185,645 | 5/1965 | Clayton | 252—46.7 |

DANIEL E. WYMAN, *Primary Examiner.*

L. G. XIARHOS, *Assistant Examiner.*